(12) United States Patent
Ostreko et al.

(10) Patent No.: US 7,008,069 B2
(45) Date of Patent: Mar. 7, 2006

(54) MIRROR MOUNTING STRUCTURE WITH OFFSET INCREASING ANGULAR ADJUSTMENT

(75) Inventors: John B. Ostreko, Zeeland, MI (US); Joshua C. Owen, Saugatuck, MI (US)

(73) Assignee: Gentex Corporation, Zeeland, MI (US)

( * ) Notice: Subject to any disclaimer, the term of this patent is extended or adjusted under 35 U.S.C. 154(b) by 49 days.

(21) Appl. No.: 10/839,366

(22) Filed: May 5, 2004

(65) Prior Publication Data

US 2004/0264016 A1    Dec. 30, 2004

Related U.S. Application Data

(60) Provisional application No. 60/467,888, filed on May 5, 2003.

(51) Int. Cl.
*B60R 1/04* (2006.01)
*G02B 7/182* (2006.01)
*G02B 7/198* (2006.01)

(52) U.S. Cl. .................. 359/876; 359/872; 248/481; 248/484

(58) Field of Classification Search ............ 248/481, 248/482, 483, 484, 288.31; 359/872, 875, 359/876; B60R 1/04

See application file for complete search history.

(56) References Cited

U.S. PATENT DOCUMENTS 3,507,562 A * 4/1970 Yamashita et al. ......... 359/606
5,100,095 A * 3/1992 Haan et al. ................. 248/549
5,931,440 A * 8/1999 Miller ........................ 248/549
6,367,939 B1 * 4/2002 Carter et al. ............... 359/879
6,540,193 B1 * 4/2003 DeLine ...................... 248/481
2003/0043590 A1 * 3/2003 Walser et al. .............. 362/494
2004/0195486 A1 * 10/2004 Rumsey et al. ............ 248/481
2004/0196577 A1 * 10/2004 Carter et al. ............... 359/871

OTHER PUBLICATIONS

Gentex Corporation, BEC II mirror sold more than one year prior to May 5, 2004, five (5) photographs.

* cited by examiner

*Primary Examiner*—John Juba, Jr.
(74) *Attorney, Agent, or Firm*—Price, Heneveld, Cooper, DeWitt & Litton, LLP

(57) ABSTRACT

A mirror mount includes a mirror-head-attached first mount component, a window-attached second mount component, and a tubular connector. The first component includes a base defining an attachment plane, an angled stem, and a first ball section with a clearance area around the stem. A bore extends into the stem for receiving an attachment screw. A clearance area is formed around the stem near the ball section and extends at an acute angle to the attachment plane, thus providing increased angular adjustability of the mirror head in at least an upward direction. The second component includes a ball section and angled extended stem, and is connected to the first component by the tubular connector. The first and second ball sections define a distance less than a distance from a flat side of the second component to the second ball section, thus providing improved rigidity against vibration.

14 Claims, 12 Drawing Sheets

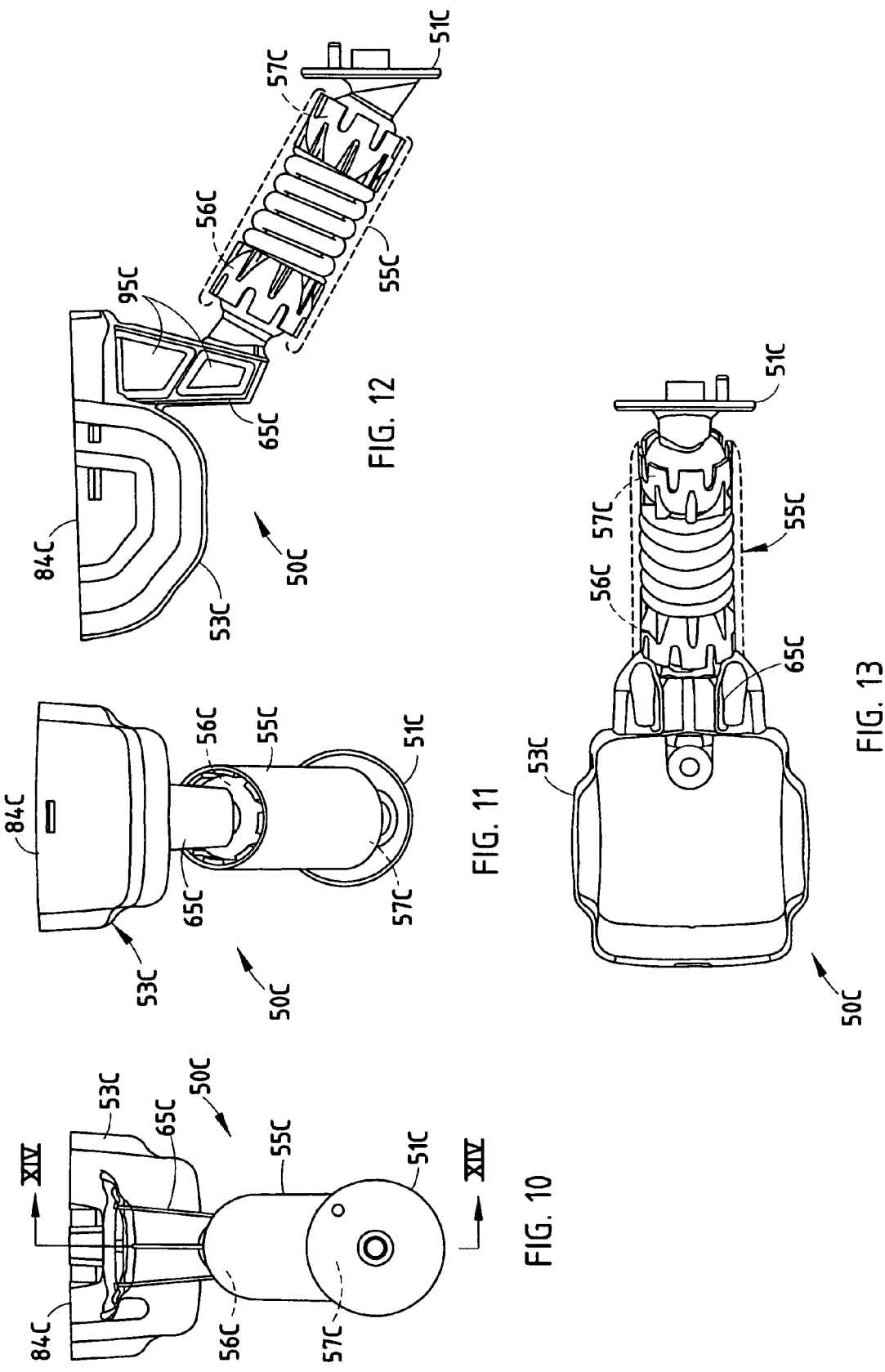

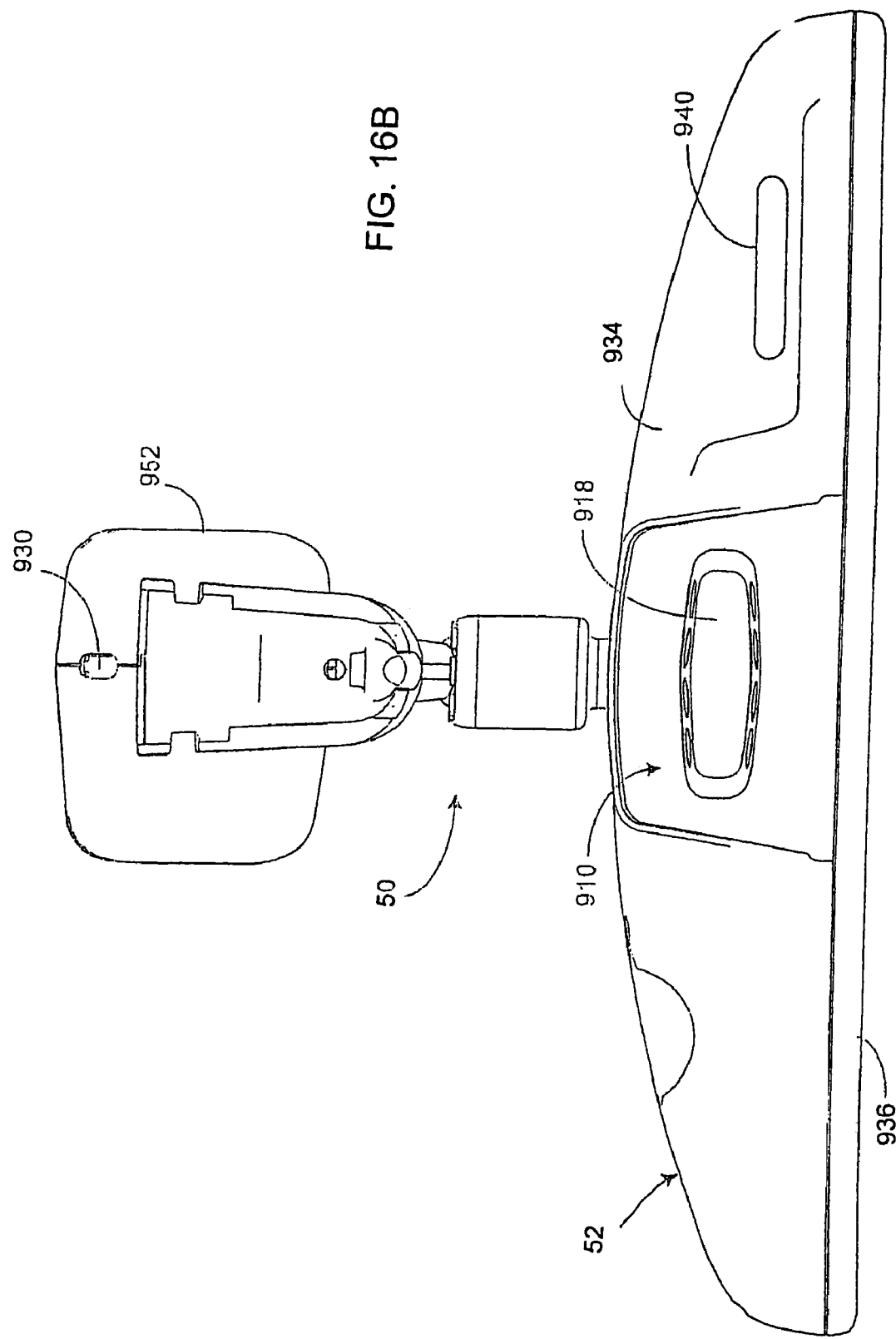

MIRROR MOUNTING STRUCTURE WITH OFFSET INCREASING ANGULAR ADJUSTMENT

CROSS-REFERENCE TO RELATED APPLICATIONS

This application claims the benefit of U.S. Provisional Application 60/467,888, filed May 5, 2003.

BACKGROUND

The present invention relates to adjustable rearview mirror support structures, and more particularly relates to mirror support structures that provide full angular adjustment while still meeting anti-vibration functional requirements and position-to-driver distance requirements.

Vibration is a problem with many vehicle rearview mirror systems, because the mirror heads are typically supported in cantilever off of a vehicle component, such as off of a front windshield or overhead console. The problem is related to vibrational amplitude and vibrational frequency of the mirror head, as it relates to the driver's eyes. The problem is compounded when the front windshield is used for support, because the glass of the windshield can flex, bend and move, in addition to gross vehicle movement from bumps and road-and-travel-caused vibrations. In particular, mirror mounts attached farther from a top edge of the front windshield glass have a greater tendency to vibrate, because the glass tends to bend and flex a greater amount at locations spaced away from the top glass edge where stiff vehicle frame members support the glass and prevent bending and flexing. Further, the longer the length of the cantilever arm (i.e., the greater the distance from the windshield to the mirror head), the greater the tendency to have greater vibration and/or to have vibratory mechanical resonance that causes greater amplitudes. Also, ball-and-socket pivot joints can aggravate the problem.

The vibration problem can be reduced by positioning a mirror head closer to a front windshield or by mounting it higher on the windshield. However, this may not be acceptable for several reasons. Vehicle manufacturers have numerous requirements concerning the position and angular adjustability of the mirror head relative to the vehicle driver. For example, the mirror head must be low enough so that the driver has a good rearward field of view. The mirror head must be physically close enough to the driver so that the driver can reach any buttons on the mirror head, and also can easily reach the mirror head for making an angular adjustment. The mirror head must have a defined range of angular adjustability, so that all drivers can adequately adjust the mirror head for their individual preference. However, with large front windshields, particularly where the front windshield extends relatively high, or where the windshield has a low near-horizontal angle, it is extremely difficult to meet all three requirements of 1) driver-reachable button locations on the mirror, 2) sufficiently high enough near-the-top-edge mount location on the windshield to minimize vibration problems (while still being low enough to minimize the cantilever arm length), and 3) providing the required range of angular adjustment for the mirror to meet the requirements of different body sizes and preferences of drivers.

In addition there is another subtle problem. Most modern mirror support structures incorporate a ball-and-socket joint that is angularly adjustable. A torsional strength of the ball-and-socket joints is increased as the ball section diameter is increased. This is because the torque that holds a selected adjusted position is related to the friction forces times the radius of the ball section (i.e., the torque arm of the frictional force is equal to a radius of the ball section). However, as the radius of the ball section is increased, so does a weight of the mounting structure, which can in turn lead to increased vibration problems. Also, the size of the overall support structure increases as components are made larger, which reduces visibility out the front windshield by the vehicle driver. Accordingly, there is tension between the requirement for a stability (i.e., a larger radius on the ball section) and the requirement for low weight and size (i.e., a smaller radius of the ball section).

FIG. 1 illustrates a typical two-ball-and-socket mirror support arrangement, where a mirror head 20 is supported by a two-ball-and-socket mount 21 on a vehicle front windshield 22. The details of the mount 21 are eliminated in FIG. 1 to better show the dimensional and motion considerations of interior rearview mirrors; but one example of a mount 21 is illustrated in FIG. 1A. The mount 21 includes a mirror-attached mount component 23, a tubular connector 24, and a window-attached second mount component 25 defining first and second ball-and-socket connections 26 and 27 (each made up of a ball section and a socket). In FIG. 1, the ball-and-socket connections 26 and 27 are not shown, but their location is shown by center points 28 and 29. As illustrated in FIG. 1A, the mirror head 20 has a center of gravity 30 located about a distance 31 from the center point 28 of the first ball section. This results in a vibrational effect shown by arrows 32. The tubular connector 24 has a length with ends extending slightly longer than the distance 33 between the center points 28 and 29, which results is a second vibrational effect shown by arrows 34. The window-attached mount component 25 defines a length 35 between the windshield 22 and the ball section 29, which results in a third vibrational effect shown by arrows 37. The windshield 22 can vibrate longitudinally along its length (as shown by arrow 38, such as due to gross vehicle movement from road bumps or wheel imbalances) or it can bend with a drum-like movement (see arrows 39 and 39A). This drumming movement tends to be greater at locations spaced farther from the edge 40 of the windshield 36 since the sheet metal edge support structure 41 both stiffly supports the glass and also potentially dampens vibration. Also, the drumming movement is greatly affected by a size of the front windshield 22, and by the angle of inclination 42 of the windshield relative to horizontal.

Another important factor is the distance 43 from the mirror head to the vehicle driver. In FIG. 1A, where the windshield 36 is a considerable distance from the vehicle driver's eyes and reach, the tubular connector 24 is often elongated to make up the distance. However, this aggravates the pendulum effects illustrated by arrows 32 and 34. The problem of vibration of the mirror head 20 is also aggravated where the mirror is supported relatively lower on the windshield 22 (i.e., farther from the edge support structure 41) a distance 39B. It is important to keep in mind that, in additional to all of the above criteria, the angular adjustability of the mirror head 20 must be maintained so that individual drivers can adjust the mirror for optimal viewing and for individual preferences. In the arrangement of FIG. 1A, the mirror head 20 can only be adjusted with small upward angles 43 and 44 about ball-and-socket connections due to interference at locations 47 and 48 with ends of the outer tube section of connector 24, while the mirror head 20 can be angularly adjustable downwardly through large angles 45 and 46 about the ball-and-socket connections. This downward adjustability is largely wasted, since much of the downward adjustability is unused, while the upward adjustability is severely limited by engagement of ends of the tubular connector 24 with the material of the mount components 23 and 25.

Accordingly, a mirror support arrangement is desired solving the aforementioned problems and having the aforementioned advantages.

SUMMARY OF THE PRESENT INVENTION

In one aspect of the present invention, a mirror mount is provided for forming a ball-and-socket connection for adjustably supporting a vehicle rearview mirror head. The mirror mount includes a first mount component with a washer-like base having a flat surface defining an attachment plane, a locator on the flat surface and adapted to orient the mount component during attachment to the mirror head, a stem extending from a side of the washer-like base opposite the attachment plane, and a ball section on an end of the stem. The ball section is larger in diameter than the stem and defines a circumferential circular clearance area around the stem at a bottom of the ball section. The clearance area is shaped and adapted to receive an end of a socket-forming component to adjustably receive and engage the ball section to form the ball-and-socket connection. The mount component includes a bore extending perpendicular to the attachment plane through the washer-like base and into the stem for receiving an attachment screw. The stem defines a first longitudinal centerline and the bore defines a second longitudinal centerline that extends at an acute angle to the first longitudinal centerline, with the circumferential circular clearance area defining a second plane that extends perpendicular to the first longitudinal centerline but that extends at the acute angle to the attachment plane.

In another aspect of the present invention, a mirror mount is provided for forming a double ball-and-socket connection for adjustably supporting a vehicle rearview mirror. The mirror mount includes a mirror-head-attached mount component having a washer-like base with a flat surface defining an attachment plane for attachment to a mirror head, a locator on the washer-like base for orienting the mount component during attachment, a first stem extending from a side of the washer-like base opposite the attachment plane, and a first ball section on an end of the first stem; the first ball section being larger in diameter than the first stem and defining a first circumferential circular clearance area around the first stem at a bottom of the first ball section; the first ball section defining a first center point. A window-attached mount component includes a base defining a planar side configured for attachment to a window-attached anchor, a second stem extending from the base opposite the planar side, and a second ball section on an end of the second stem; the second ball section being larger in diameter than the second stem and defining a second circumferential circular clearance area around the second stem at a bottom of the second ball section; the second ball section defining a second center point; the base, the second stem and the second ball section being formed by solid and continuous material. A connector includes a tube section extending between the first and second ball sections and includes first and second socket-defining components that adjustably angularly engage the first and second ball sections, respectively, to define adjustable first and second ball-and-socket connections. The center points of the first and second ball sections define a first distance that is less than a second distance between the planar side and the second center point of the second ball section. The first and second circumferential circular clearance areas are shaped to receive ends of the tube section to maintain maximum angular adjustability. By this arrangement, a multi-axial angular adjustability provided by the first and second ball-and-socket connections is maintained while stability and strength provided by the solid and continuous material forming the second distance on the window-attached mount component is maintained.

The present inventive concepts include several different aspects that solve several problems. The offset pivot concept (i.e., angled stem, ball, and socket arrangement) result in a mirror support arrangement that allows a full range of angular adjustment for the mirror head, while maintaining a desired mirror button location and a desired mirror glass/reflector location, even if the requirements for mirror button location and mirror glass/reflector location are in conflict with traditional mount technology that would cause interference and hence be limited in angular adjustability. With the present inventive concepts, stability against vibration is improved, because the offset pivot allows the buttons to be mounted higher on the windshield, where more stable support is provided due to less of a "drum-type" bending movement of the front windshield glass. In the present inventive concepts, the windshield-attached mount component is elongated to position the mirror head farther from the windshield and closer to the vehicle driver, thus moving the mirror toward the driver so that the mirror is within arms length for grasping and easy adjustment. By the present inventive concepts, an 18-mm ball section can be used, despite its increased weight, which allows greater torsional strength in the ball-and-socket connections.

These and other aspects, objects, and features of the present invention will be understood and appreciated by those skilled in the art upon studying the following specification, claims, and appended drawings.

BRIEF DESCRIPTION OF DRAWINGS

FIGS. 8–13 are front perspective, side perspective, front, rear, side, and top views of a modified two-ball mirror support system embodying the present invention, the FIGS. 12–13 showing the tube section as dashed lines to reveal inner components.

FIG. 16B is a plan view of the top of the interior rearview mirror system constructed according to the present invention.

DETAILED DESCRIPTION OF PREFERRED EMBODIMENTS

Figure 1:
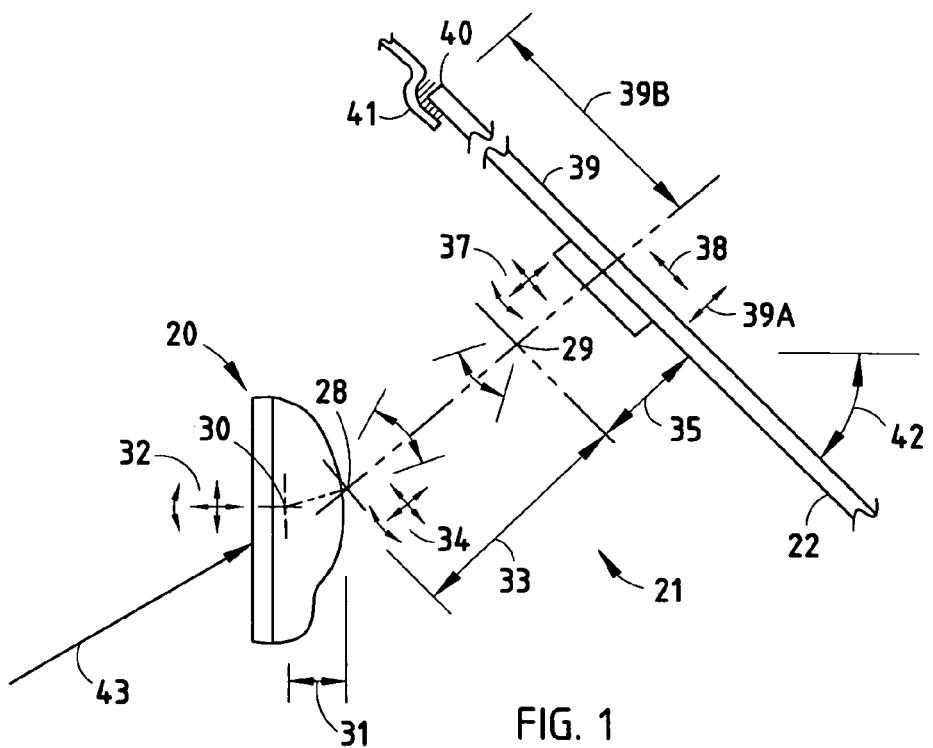
FIG. 1 is a schematic drawing illustrating several relevant dimensions and directions (angular and linear) that affect linear and angular vibration in a rearview mirror.

Reference will now be made in detail to the present preferred embodiments of the invention, examples of which are illustrated in the accompanying drawings. Wherever possible, the same reference numerals will be used throughout the drawings to refer to the same or like parts.

Figure 2:
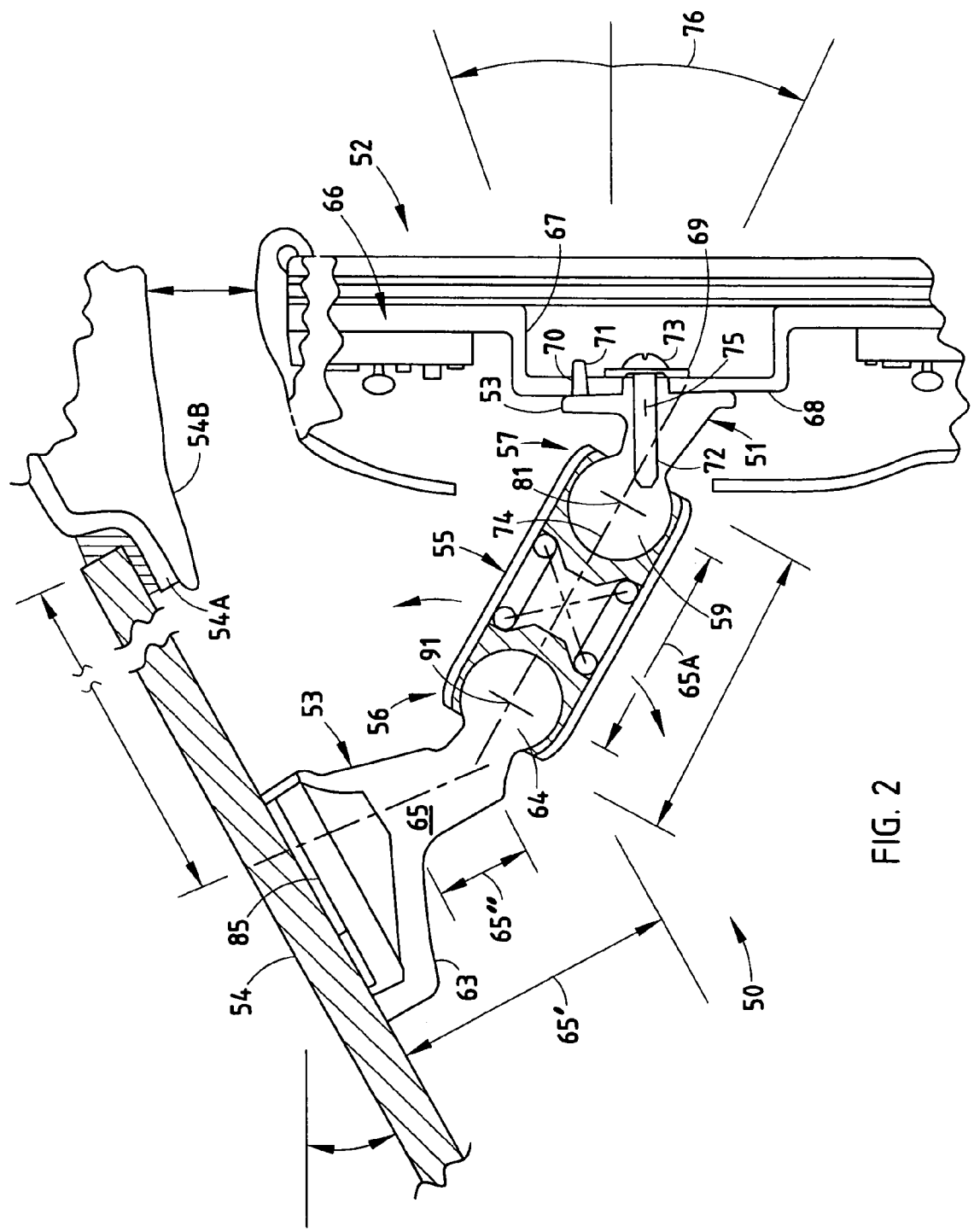
FIG. 2 is a side cross-sectional view of a two-ball mirror mount embodying the present invention, including a mirror-head-attached mount component, a window-attached mount component, and a tubular connector embodying the present invention.

For purposes of description herein, the terms "upper," "lower," "right," "left," "rear," "front," "vertical," "horizontal," "top," "bottom," and derivatives thereof shall relate to the invention as viewed in FIG. 2. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

Figure 7:
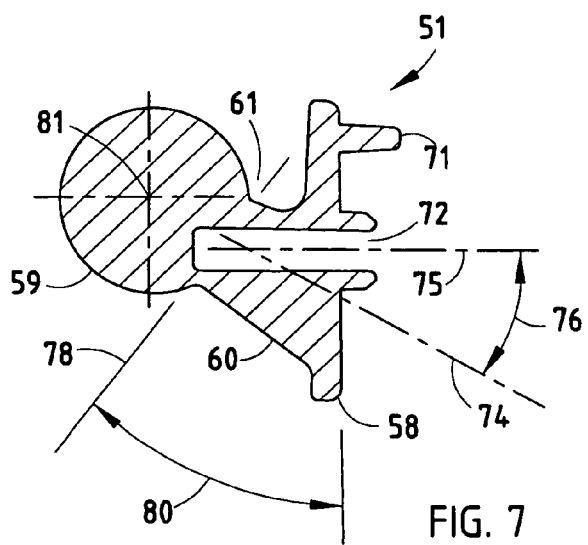
Figure 8:
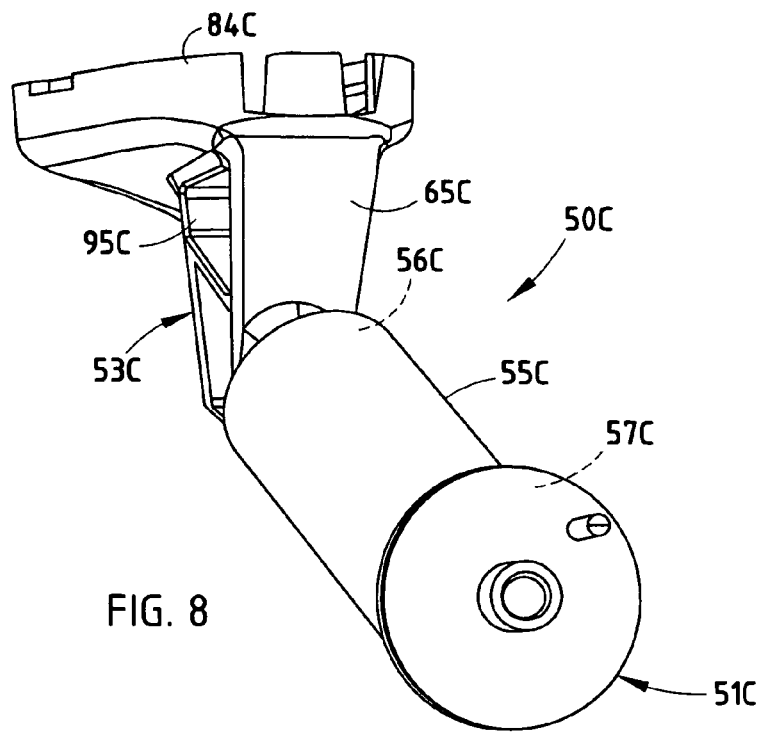
Figure 9:
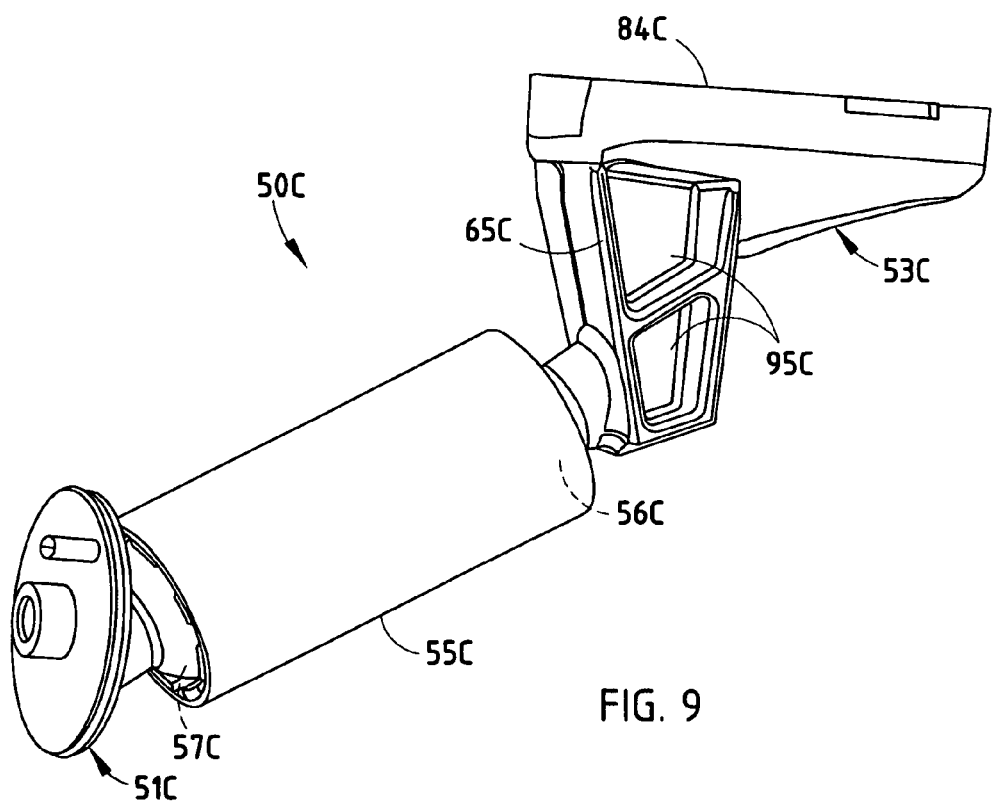
Figure 14:
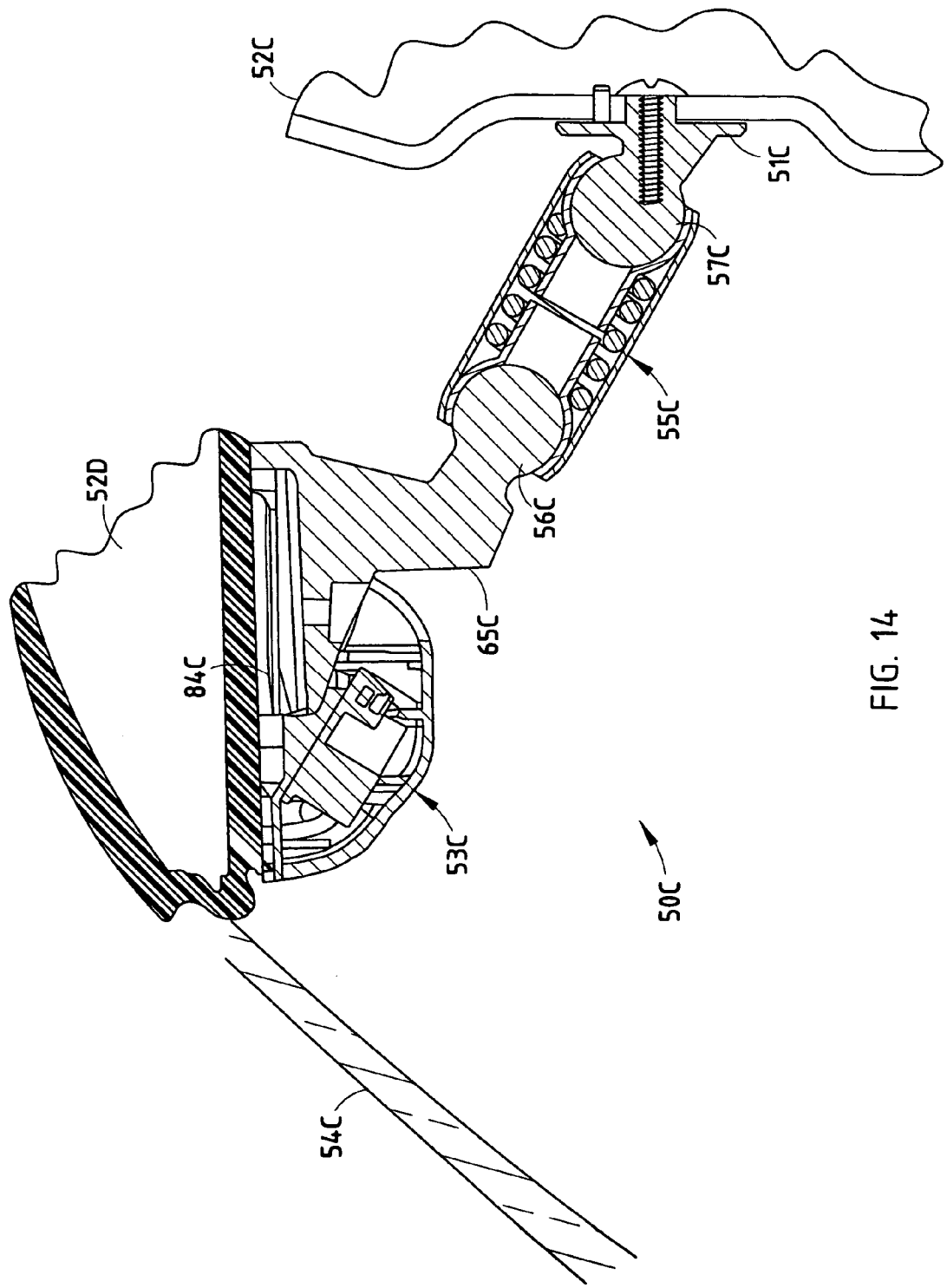
FIG. 14 is a vertical cross section take along the line XIV—XIV in FIG. 10.

A mirror mount 50 (FIG. 2) includes a mirror-head-attached mount component 51 attached to a rearview mirror head 52, a window-attached mount component 53 attached to a windshield 54 below the windshield top edge 54A and headliner 54B, and a tubular connector 55 connecting the mount components 51 and 53 with two angularly adjustable ball-and-socket connections 56 and 57. The mirror-head-attached mount component 51 (FIG. 7) is a one-piece die-cast component, and includes a washer-like base 58, a ball section 59, and an angled stem 60 (angled at about 20° to 45°, or more preferably about 30°) which holds the ball section 59 at an angle to the base 58 to create an angled circumferential clearance area 61 for receiving an end of the tubular connector 55. This provides improved angular positioning and adjustment of the mirror head 52, while still meeting the constraints and dimensional requirements of positioning the mirror head 52 within the vehicle. Specifically, the illustrated arrangement provides a 30° angle in the stem 60, and as a result allows for at least a 15° angular adjustment (and more preferably at least a 25° angular adjustment) of the mirror head 52 in both up, down, and sideways directions (i.e., a 25° angular adjustment in all directions from the centerline 74).

The window-attached mount component 53 includes a planar-sided second base 63, a ball section 64, and an elongated stem 65, each of which form part of a one-piece casting allowing the material to be a solid and continuous material for improved strength and vibrational stability. Further, the dimension 65' from the planar side of the base 63 to a center point of the ball section 64 is at least about ½ inch longer (and still more preferably is at least about ⅝ inch longer) than in traditional mirror supports due to the elongated portion 65". As a result, the dimension 65' is much greater than the distance 65A between the center points 81 and 91 of the ball sections 59 and 64, as discussed below.

This arrangement results in a mirror support that provides an improved stability against unacceptable vibration of an interior rearview mirror, as described below. Due in part to the reduced sensitivity, the diameter of ball sections 59 and 64 can be increased from 15-mm to 18-mm.

Though one particular mirror head 52 is illustrated (FIG. 2), it is contemplated that the present invention will work with a variety of different mirror head constructions, including mirror heads where the structure for attaching the mount component 51 is on a mirror housing (see FIG. 1A) and/or on an internal frame (see FIG. 2). The illustrated mirror head 52 includes a frame 66 having a bracket 67 providing a flat attachment surface 68. A first hole 69 is located in a center of the bracket 67 and a second hole 70 is located thereabove.

Figure 6:
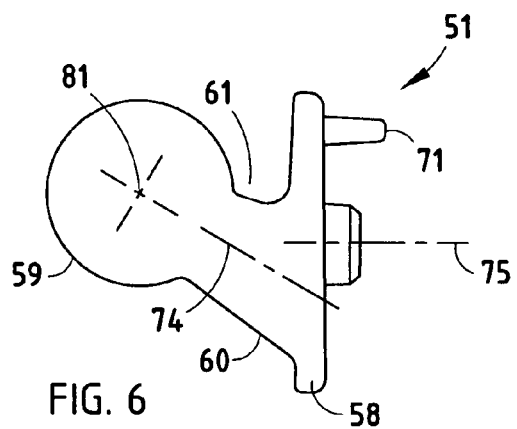
FIGS. 6 and 7 are side and side cross-sectional views of the mirror-head-attached mount component.

The washer-like base 58 of the mirror-head-attached mount component 51 (FIGS. 6–7) is adapted to lie flat against the attachment surface 68, with the ball section 59 and the angled stem 60 extending outwardly and rearwardly at an angle toward the windshield 22. The stem 60 extends at an angle to the washer-like base 58, such as about 45 degrees. A protrusion at a bottom of the stem 60 registers in the hole 69 and a locator protrusion 71 extends into hole 70 to orient the mount component 51. The mount component 51 includes a bore 72 extending perpendicular to the attachment plane defined by the attachment surface 68 of the washer-like base 58 and into the stem 60 (at an angle to the stem 60) for receiving an attachment screw 73. The stem 60 defines a first longitudinal centerline 74 and the bore 72 defines a second longitudinal centerline 75 that extends at an acute angle 76 to the first longitudinal centerline 74. A circumferential circular clearance area 61 located around the stem 60 adjacent the ball section 59 defines a second plane 78 defined by clearance area 61 that extends perpendicular to the first longitudinal centerline 74 but that extends at the acute angle 80 to the attachment plane 68. The first ball section 59 defines a first center point 81.

Figure 3:
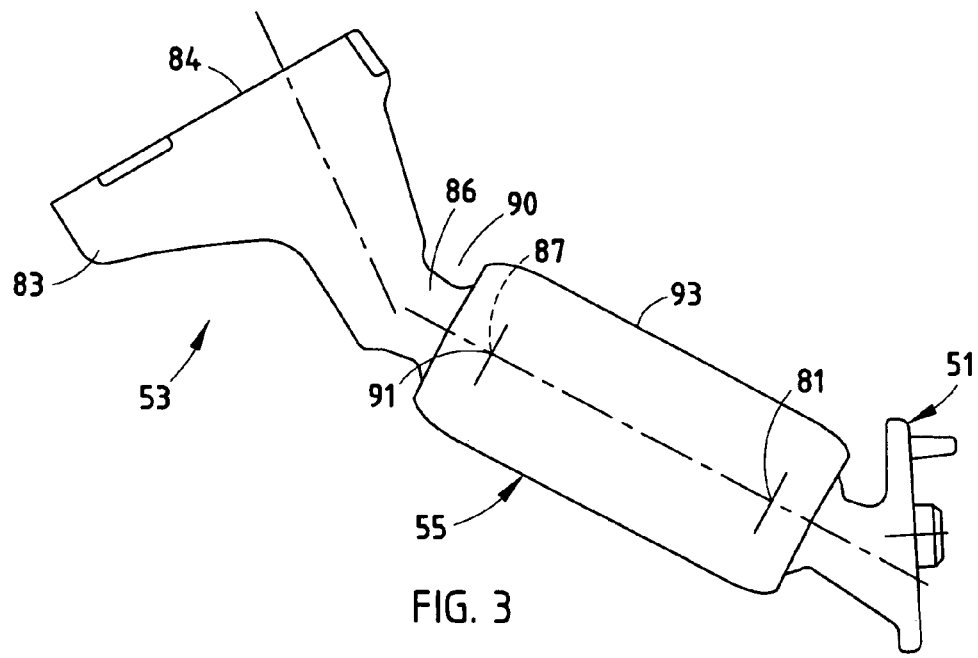
FIGS. 3 and 4 are side and front views of the mirror mount shown in FIG. 2.
Figure 4:
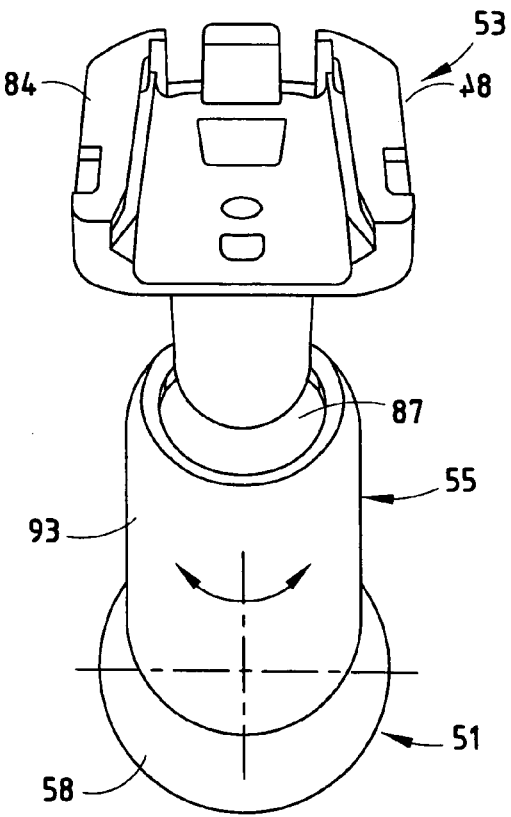
Figure 5:
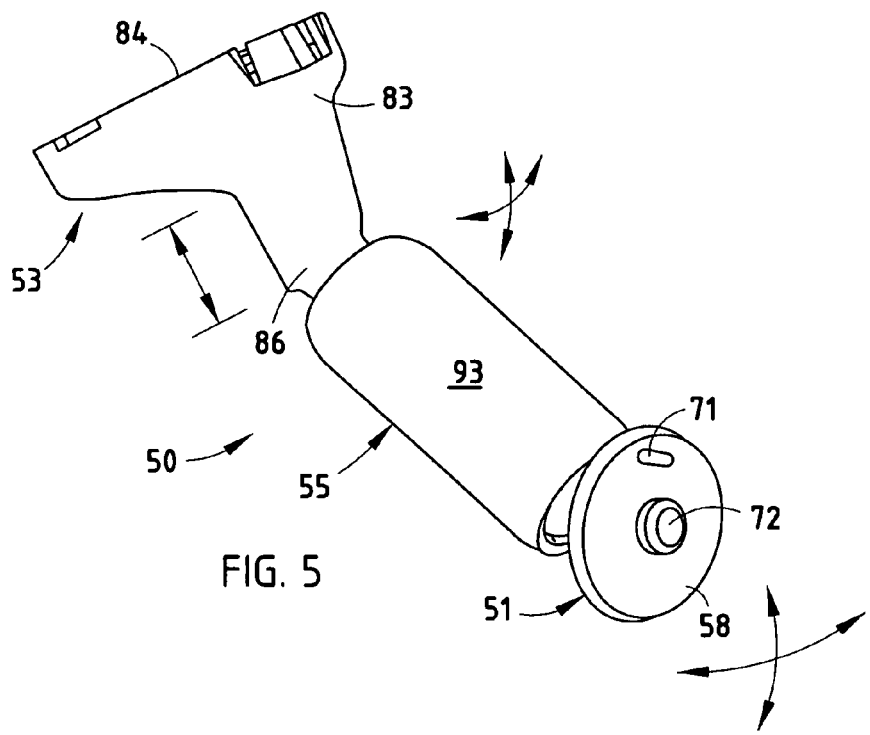
FIG. 5 is a side view show angular adjustability of the mirror mount of FIG. 2.

The window-attached mount component 53 (FIG. 3) is a one-piece die-cast component that is formed by solid and continuous material. The mount component 53 includes a second base 83 defining a planar side 84 configured for attachment to a window-attached anchor 85, a second stem 86 extending from the second base 83 opposite the planar side 84, and a second ball section 87 on an end of the second stem 86. The second ball section 87 has a diameter larger than the second stem 86 and defines a second circumferential circular clearance area 90 around the second stem 86 at a bottom of the second ball section 87. The second ball section 87 defines a second center point 91.

The connector 55 includes a tube section 93 extending between the first and second ball sections 59 and 87, and includes first and second socket-defining components 94 and 95 in each end of the tube section 93 that adjustably angularly engage the first and second ball sections, respectively, to define adjustable first and second ball-and-socket connections. The center points 81 and 91 of the first and second ball sections defining a first distance that is less than a second distance between the planar side and the second center point of the second ball section. The first and second circumferential circular clearance areas are shaped to receive ends of the tube section to maintain maximum angular adjustability. By this arrangement, a multi-axial angular adjustability provided by the first and second ball-and-socket connections is maintained while stability and strength provided by the solid and continuous material forming the second distance on the window-attached mount component is maintained.

The present mirror mount arrangement allows the attachment to the front windshield to be placed higher on the windshield than previous mirror mount systems. For example, a traditional "standard" two-ball mount system would be forced to place its location of attachment to the front windshield at about 4 inches below the headliner (measured from the headliner front edge downwardly to a top of the windshield-attached mount component). Contrastingly, the present mounting system allows the attachment to the front windshield to be placed at about 1¾ inches from a bottom of the headliner to a top of the windshield-attached mount component. The present mirror mount arrangement further potentially allows the mirror head to be mounted from an overhead console or from the headliner while still maintaining a two-ball-and-socket adjustable mount system.

Figure 1A:
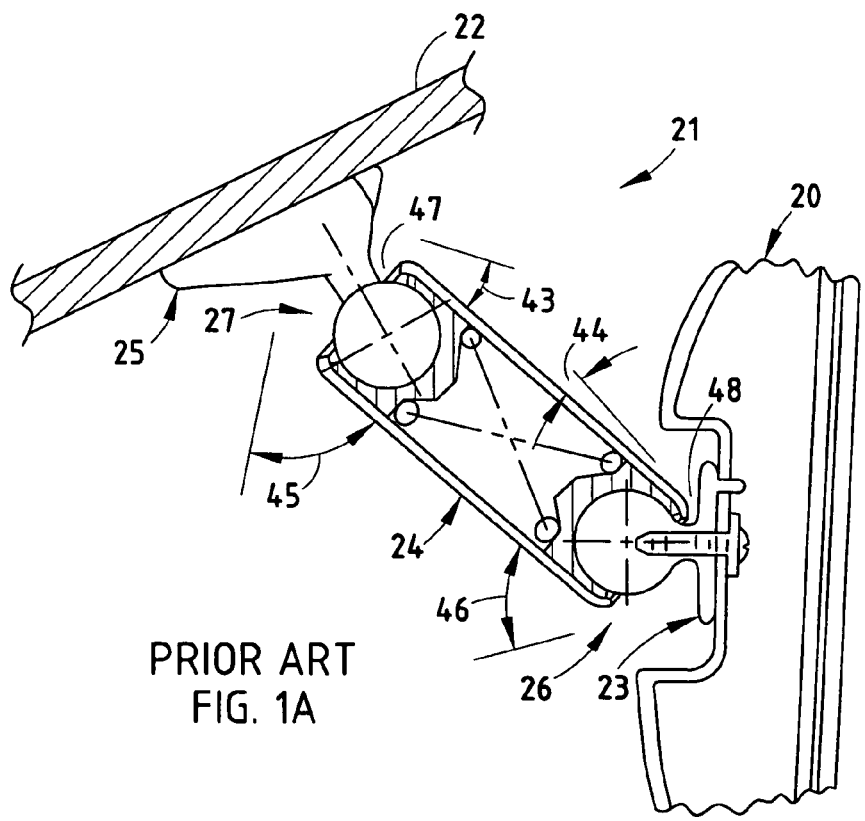
FIG. 1A is a side cross-sectional view of a prior art mirror head and mirror mount arrangement.

Finite element analysis has shown that a standard two-ball-and-socket mount system similar to that shown in FIG. 1A has a lateral first mode of vibration of 51.5 hertz, and a vertical second mode of vibration of 95.5 hertz. Using the same analysis techniques, the improved mount arrangement shown in FIG. 2 has a lateral first mode of vibration of 57.3 hertz and a second mode of vibration of 104.1 hertz. This is considered to be a significant and important improvement in vibrational stability, particularly in view of the distance of the mirror head to available support locations around the mirror head and the functional criteria and requirements of mirror head positioning.

FIGS. 8–14 illustrate a mirror mount 50C similar to mirror mount 50, but the mirror mount 50C is attached to an overhead support, such as an overhead vehicle console or roof component of a vehicle. In mirror mount 50C, component and features that are identical or similar to those of mirror mount 50, but the letter "C" is added to reduce redundant discussion.

Mirror mount 50C (FIG. 14) includes a mirror-head-attached mount component 51C attached to a rearview mirror head 52C, an overhead-attached mount component 52C attached to an overhead component such as an overhead console 52D (rearward of the windshield 54C), and a tubular connector 55C connecting the mount components 51C and 53C with two angularly adjustable ball-and-socket connections 56C and 57C. The component 53C is modified to change an angle of its side 84C, to facilitate attachment to the overhead console 52D. As a result, stem 65C is modified to become more vertical (when in a vehicle-mounted position). Also, it is noted that stem 65C has side-located recesses or depressions 95C that reduce its weight while maintaining its beam strength and stability.

It is contemplated that the present inventive concepts can be used in combination with mirrors having many different options to create synergistic and non-obvious combinations that provide surprising and unexpected benefits not previously possible. Therefore, it will be appreciated by those skilled in the art that various other vehicle accessories and components may be incorporated in the previously described mirror mount 50 in whole or in part and in various combinations. Such vehicle accessories and components may be mounted within, on or to the rearview mirror head 52, window-attached mount component 53, attachment to the rearview mirror head 52 or the window-attached mount component 53, or in a console or other housing associated with the interior rearview mirror having the mirror mount 50 of the present invention. Additionally, any such vehicle accessories may share components with one another, such as processors, sensors, power supplies, wire harnesses and plugs, displays, switches, antennae, etc. Examples of other vehicle accessories, components or features are described further below.

Figure 15A:
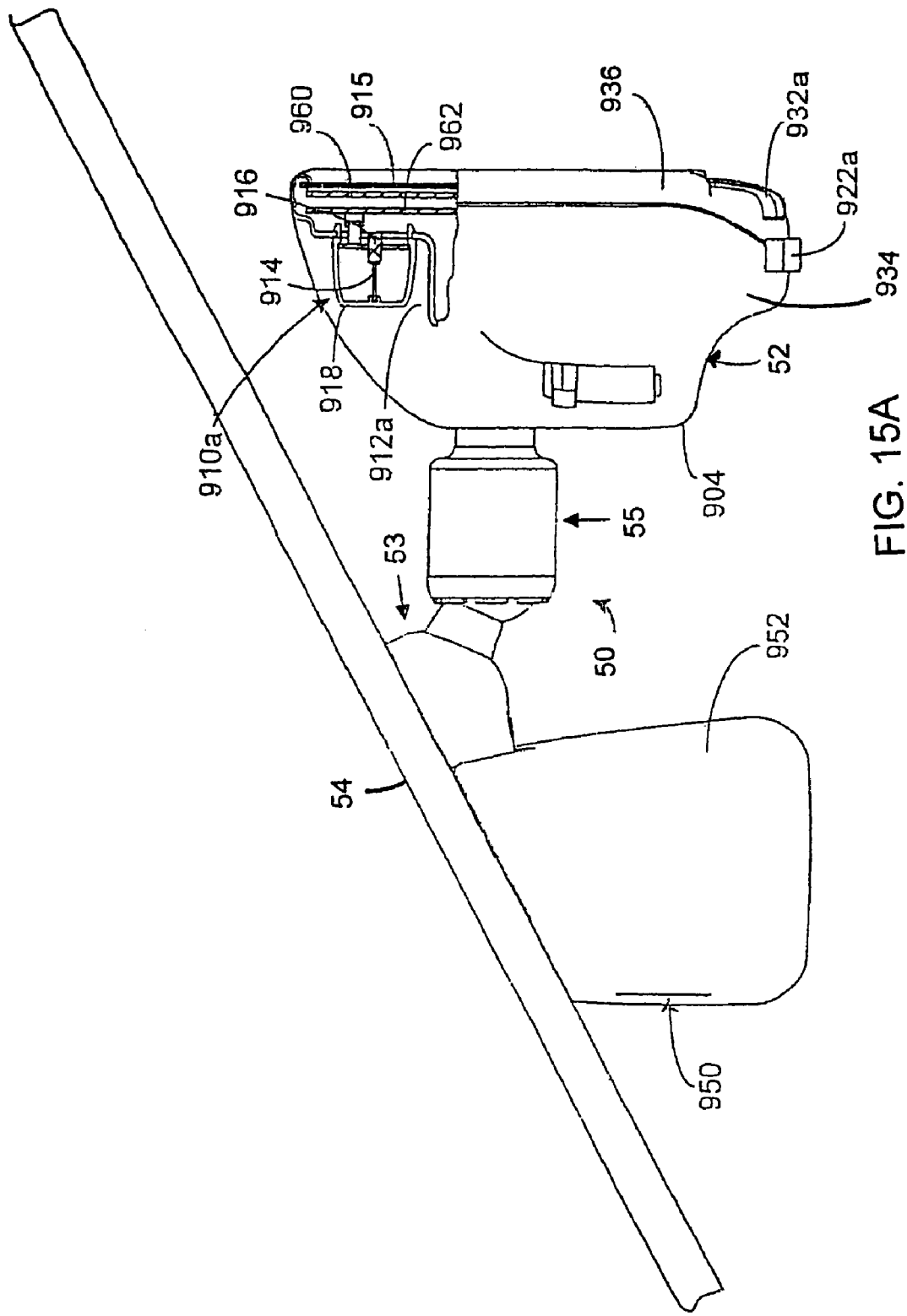
FIG. 15A is an elevational view of the side of the interior rearview mirror system constructed according to the present invention connected to a windshield.
Figure 15B:
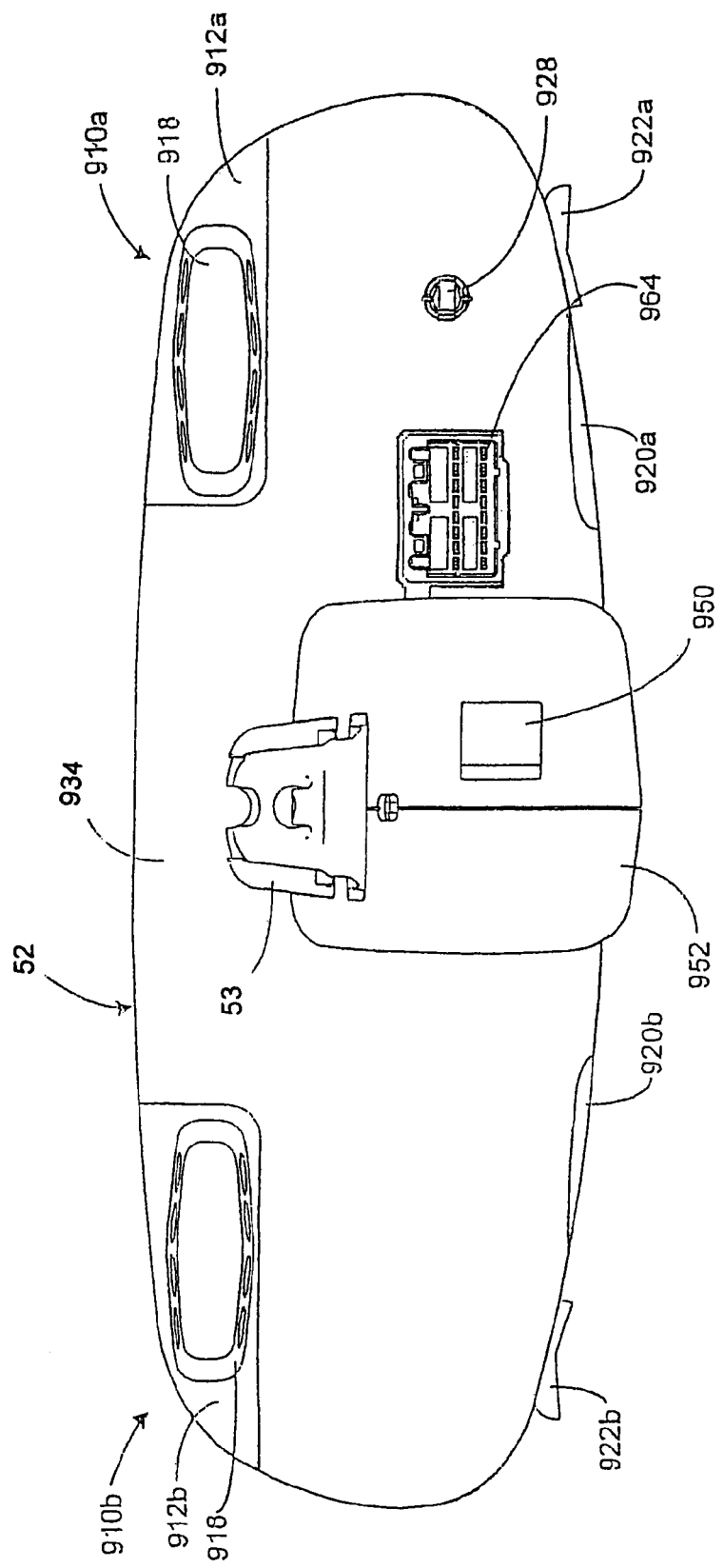
FIG. 15B is an elevational view of the rear of the interior rearview mirror system constructed according to the present invention.
Figure 15C:
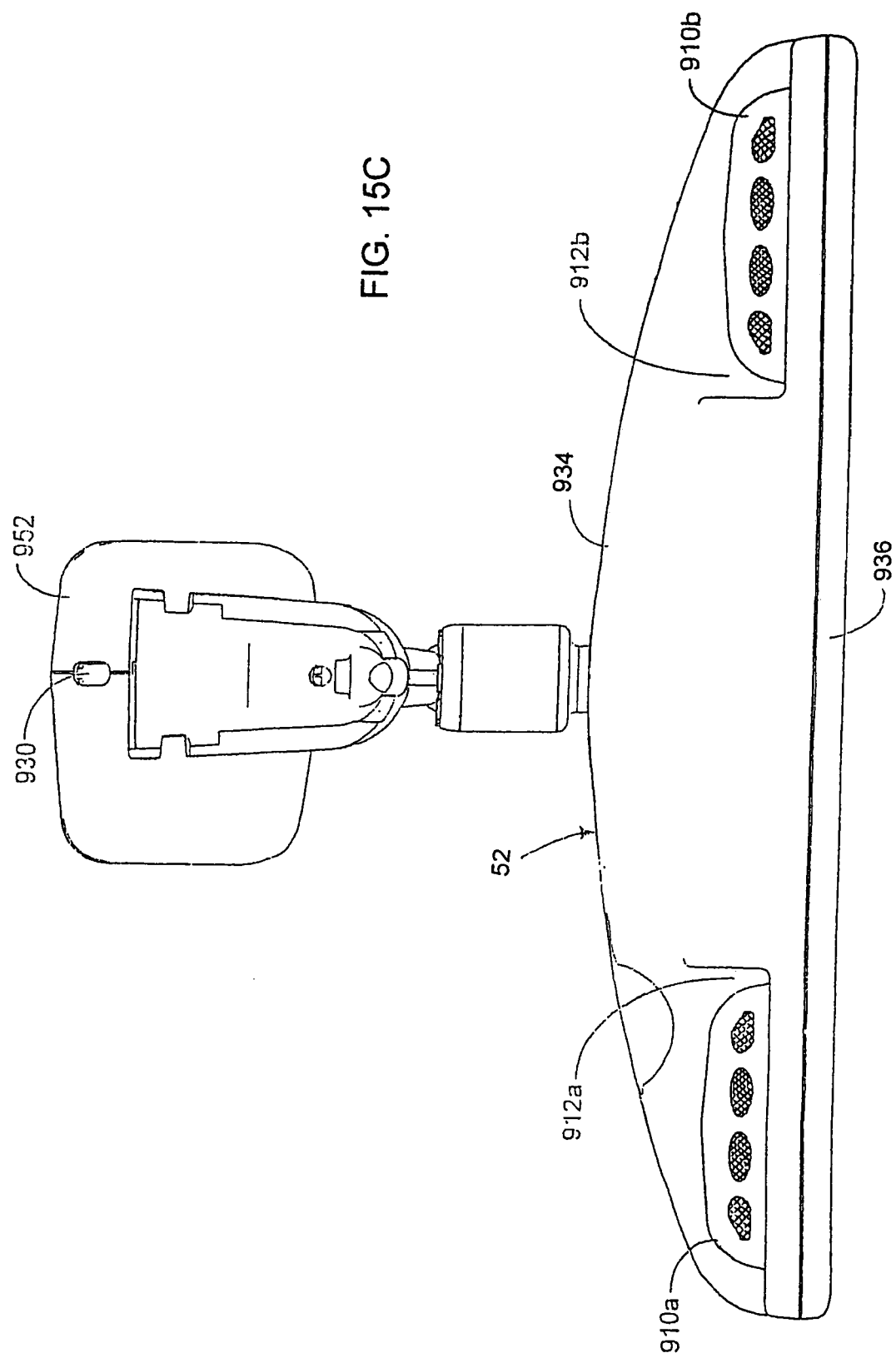
FIG. 15C is a plan view of the top of the interior rearview mirror system constructed according to the present invention.

An example of a system incorporated in the interior rearview mirror includes an electronic compass system within the rearview mirror head 52 of the interior rearview mirror as described in U.S. patent application Ser. No. 60/449,828 entitled "ELECTRONIC COMPASS SYSTEM," the entire contents of which are incorporated in its entirety herein by reference. FIGS. 15A–15C show another embodiment of the interior rearview mirror in which any of the electronic compass systems described in U.S. patent application Ser. No. 60/449,828 are incorporated. As illustrated in FIGS. 15A–15C, the rearview mirror head 52 comprises a bezel 936 and a rear housing section 934. The bezel 936 and the rear housing section 934 combine to define the rearview mirror head 52 for incorporation of features in addition to a reflective element 915 and information displays 905a and 905b. Commonly assigned U.S. Pat. Nos. 6,102,546; D410,607; 6,407,468; 6,420,800; and 6,471,362, the disclosures of which are incorporated in their entireties herein by reference, describe examples of various bezels, cases and associated button constructions that may be used with the present invention. Furthermore, the rear housing section 934 and the bezel 936 can combine to maintain the reflective element in position within the rearview mirror head 52 using the structure and process disclosed in commonly assigned U.S. Provisional Patent Application entitled "REFLECTIVE ELEMENT HOLDER FOR REARVIEW MIRROR" and assigned U.S. patent application Ser. No. 60/536,471, the entire contents of which are hereby incorporated herein by reference. Moreover, any of the mirror components can be made of a magnesium alloy as described in commonly assigned U.S. patent application Ser. No. 10/812,110, the entire contents of which are hereby incorporated herein by reference.

Figure 16A:
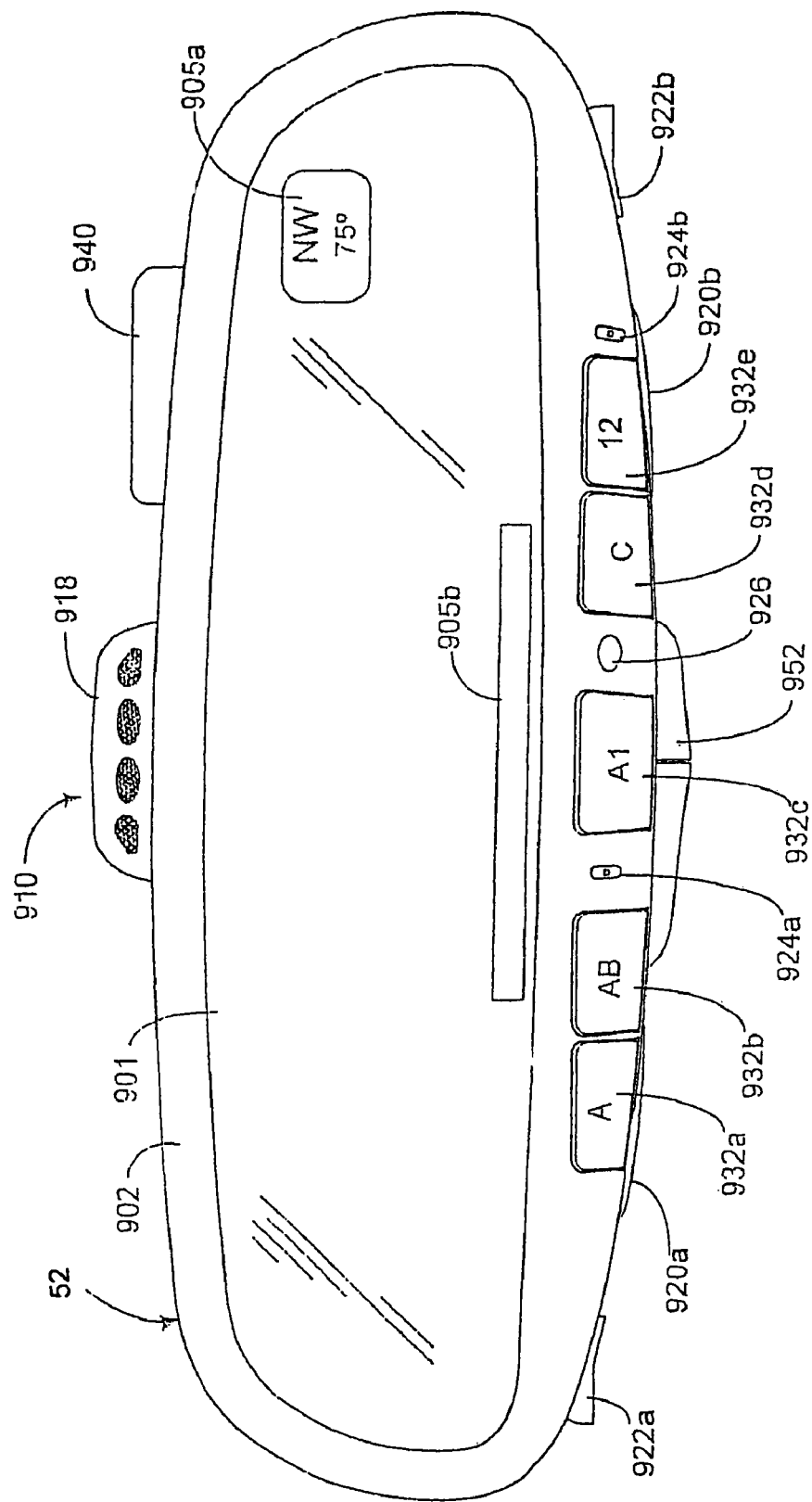
FIG. 16A is an elevational view of the front of the interior rearview mirror system constructed according to the present invention.

As depicted in FIGS. 15A–15C, the interior rearview mirror may comprise first and second microphones 910a and 910b. Examples of microphones for use with the present invention are described in commonly assigned U.S. patent application Ser. No. 09/444,176, U.S. Pat. Nos. 6,614,911 and 6,882,734 and PCT Application No. PCT/US02/32386, the disclosures of which are incorporated in their entireties herein by reference. Although the two microphones are shown as being mounted to the backside of rear housing section 934, one or more such microphones may be mounted on the top of the interior rearview mirror (as shown in FIGS. 16A and 16B), on the bottom of the interior rearview mirror, or anywhere within the rear housing section 934 or bezel 936. Preferably, two microphones 910a and 910b are incorporated, one near each end, into the interior rearview mirror on the backside of the rear housing section 934 within recessed portions 912a and 912b. As shown in FIG. 15A, the microphones are constructed with acoustic dam 914 extending around transducer 916 within microphone housing 918. Additional details of this preferred construction are disclosed in commonly assigned International PCT Application No. PCT/US02/32386, the entire disclosure of which is incorporated herein by reference. The audio systems including the microphones may be integrated, at least in part, in a common control with information displays and/or may share components with the information displays. In addition, the status of these systems and/or the devices controlled thereby may be displayed on the associated information displays.

As shown in FIGS. 16A and 16B, a single microphone 910 is provided on the top side of the rearview mirror head 52. In this construction, it is preferable to include two transducers in microphone housing 918 in a manner similar to that disclosed in the above-referenced International PCT Application No. PCT/US02/32386 and U.S. Pat. No. 6,882,734.

The interior rearview mirror may also include first and second switches 922a and 922b. Suitable switches for use with the present invention are described in detail in commonly assigned U.S. Pat. Nos. 6,407,468; 6,420,800; 6,426,568; 6,471,362 and 6,614,579, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using the switches.

The interior rearview mirror may also include first and second indicators 924a and 924b. Various indicators for use with the present invention are described in commonly assigned U.S. Pat. Nos. 5,803,579; 6,335,548; 6,441,943; 6,521,916; 6,523,976; 6,670,207; and 6,805,474 as well as commonly assigned U.S. patent application Ser. No. 09/723,675, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

The interior rearview mirror may further include first and second light sensors 926 and 928 serving as glare and ambient sensors, respectively. Preferred light sensors for use within the present invention are described in detail in commonly assigned U.S. Pat. Nos. 5,923,027; 6,313,457; 6,359,274; 6,379,013; and 6,402,328; 6,679,608 and 6,831,268, the disclosures of which are incorporated in their entireties herein by reference. The glare sensor 926 and/or ambient sensor 928 automatically control the reflectivity of a self dimming reflective element as well as the intensity of information displays and/or backlighting. The glare sensor 926 may also be used to sense headlights of trailing vehicles and the ambient sensor is used to detect the ambient lighting conditions that the system is operating within. In another embodiment, a sky sensor 930 may be incorporated positioned to detect light levels generally above and in front of associated vehicle. The sky sensor 930 may be used to automatically control the reflectivity of a self-dimming element, the exterior lights of a controlled vehicle and/or the intensity of information displays. The interior rearview mirror may further include sun-load sensors for sensing light levels towards the driver side and passenger side of the vehicle so as to control the climate control system of the vehicle.

Additionally, the interior rearview mirror may include first, second, third, fourth and fifth operator interfaces 932a–932e located in the bezel 936. Each operator interface is shown to comprise a backlit information display "A," "AB," "A1," "49," and "12". It should be understood that these operator interfaces can be incorporated anywhere in the associated vehicle, for example, in the mirror case, accessory module, instrument panel, overhead console, dash board, seats, center console, etc. Suitable switch construction is described in detail in commonly assigned U.S. Pat. Nos. 6,407,468; 6,420,800; 6,426,568; 6,471,362 and 6,614,579, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIGS. 15A–15C, 16A and 16B, it should be understood that fewer or more individual devices may be incorporated in any location within the associated vehicle and as described within the references incorporated herein.

A window-attached mount component 53 is included for mounting the interior rearview mirror within a vehicle either to the windshield, or to the vehicle roof structure. It should be understood that a host of accessories may be incorporated into the window-attached mount component 53 or into a housing 952 attached to the window-attached mount component 53 such as a rain sensor (and therefore outside of a periphery of the button), a camera, a headlight control, additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays. An example of a rain sensor in a window-attached mount component 53 is disclosed in commonly assigned U.S. patent application Ser. No. 60/472,017, the entire disclosure of which is incorporated in its entirety herein by reference.

The interior rearview mirror is shown in FIG. 15A to further comprise a circuit board on which the compass sensor module (not shown) may be mounted, and a daughter board 962 with an input/output bus interface (not shown).

The electrical output signal from either, or both, of the sensors 926 and 928 may be used as inputs to a controller (not shown) to control the reflectivity of the reflective element 16 and/or the intensity of any one or all of the displays 905a and 905b. The details of various control circuits for use herewith are described in commonly assigned U.S. Pat. Nos. 5,883,605; 5,956,012; 6,084,700; 6,222,177; 6,244,716; 6,247,819; 6,249,369; 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module is described as being mounted to circuit board, it should be understood that the sensor module may be located within the window-attached mount component 53, with an accessory module of the interior rearview mirror or at any location within an associated vehicle such as under a dash board, in an overhead console, a center console, a trunk, an engine compartment, etc. The above described compass systems may be integrated, at least in part, in a common control with information displays and/or may share components with the information displays. In addition, the status of these systems and/or the devices controlled thereby may be displayed on the associated information displays.

The circuit board may comprise a controller (not shown), such as a microprocessor, and the daughter board 962 may comprise an information display 905a. The microprocessor may, for example, receive signal(s) from the compass sensor module and process the signal(s) and transmit signal(s) to the daughter board to the control display 905a to indicate the corresponding vehicle heading. As described herein and within the references incorporated by reference herein, the controller may receive signal(s) from light sensor(s), rain sensor(s), automatic vehicle exterior light controller(s) (not shown), microphone(s), global positioning systems (not shown), telecommunication systems (not shown), operator interface(s) and a host of other devices, and control the information display(s) to provide appropriate visual indications.

The controller (or controllers) used to control the compass system may, at least in part, control the reflectivity of the reflective element 915, exterior lights, the rain sensor, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. A controller (or controllers) may receive signals from switches and/or sensors associated with any of the devices described herein and in the references incorporated by reference herein to automatically manipulate any other device described herein or described in the references included by reference. The controller may be, at least in part, located outside the interior rearview mirror or may comprise a second controller elsewhere in the vehicle or additional controllers throughout the vehicle. The individual processors may be configured to communicate serially, in parallel, via BLUETOOTH™ protocol, wireless communication, over the vehicle bus, over a CAN bus or any other suitable communication. A multi-pin connector interface 964 may be provided for such external connections.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,465,963; 6,429,594; 6,379,013; 6,653,614; 6,611,610; 6,621,616; 6,587,573; 6,861,809 and 6,774,988 and U.S. patent application Ser. Nos. 60/404,879 and 60/394,583, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 950, may be housed in accessory housing 952 attached to the window-attached mount component 53.

Moisture sensors and windshield fog detector systems are described in commonly-assigned U.S. Pat. Nos. 5,923,027; 6,313,457; 6,681,163 and 6,617,564, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The interior rearview mirror may further include one or more antennae 940 for receipt and/or transmission of RF signals. Appropriate receiving, transmitting, and/or processing circuitry may further be included in or attached to the interior rearview mirror. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in an interior rearview mirror system are disclosed in commonly assigned U.S. Pat. Nos. 6,215,389; 6,431,712; 6,861,942 and 6,696,935, the entire disclosures of which are incorporated herein by reference. Examples of a GPS system incorporated in the interior rearview mirror are disclosed in commonly assigned U.S. Pat. Nos. 6,166,698; 6,297,781; 6,396,446; and in U.S. Patent Application Publication No. US 2002/0032510 A1, the entire disclosures of which are incorporated herein by reference. An example of a LORAN system incorporated in an interior rearview mirror system is disclosed in commonly assigned U.S. Pat. No. 6,539,306, the entire disclosure of which is incorporated herein by reference. An example of both a telephone/telematics system and a BLUETOOTH™ system incorporated in an interior rearview mirror system is disclosed in commonly assigned U.S. Patent Application Publication No. US 2002/0032510 A1, the entire disclosure of which is incorporated herein by reference. Examples of a trainable garage door opening systems and RKE systems incorporated in an interior rearview mirror system are disclosed in U.S. Pat. No. 6,091,183, the entire disclosures of which are incorporated herein by reference.

The interior rearview mirror may further include an infrared (IR) transmitter/receiver for transmitting/receiving information to and from the interior rearview mirror and possibly to and from the vehicle. An example of such an interior rearview mirror system is disclosed in commonly-assigned U.S. Pat. No. 6,407,712, the entire disclosure of which is incorporated herein by reference.

The interior rearview mirror may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly assigned U.S. Pat. No. 6,186,698 may be used, the entire disclosure of which is incorporated herein by reference. Examples of backlit indicia panel displays are disclosed in commonly-assigned U.S. Pat. Nos. 6,170,956; 6,356,376; 6,870,655 and 6,572,233, the entire disclosures of which are incorporated herein by reference. Various displays used in interior rearview mirror systems are disclosed in commonly assigned U.S. Pat. No. 6,356,376 and 6,700,692, the entire disclosures of which are incorporated herein by reference. The interior rearview mirror may also include a light as disclosed in commonly assigned U.S. patent application Ser. No. 10/826,047, the entire contents of which are hereby incorporated herein by reference. Furthermore, any lights incorporated into the mirror may comprise a LED attached by the method disclosed in commonly assigned U.S. patent application Ser. No. 10/833,959, the entire contents of which are hereby incorporated herein by reference.

The wiring for the vehicle accessories in the interior rearview mirror may be run through the window-attached mount component 53 and along the windshield (if the window-attached mount component 53 does not already extend to the headliner) under a wire cover (not shown). An example of an interior rearview mirror system in which the wiring for accessories in the housing 12 are routed through the window-attached mount component 53 is disclosed in commonly assigned U.S. Pat. No. 6,467,919, the entire disclosure of which is incorporated herein by reference.

While the present invention has been described as being implemented with the sensors positioned within the rearview mirror head 52 of the interior rearview mirror, the sensors could be mounted in the mounting foot or in any other location of the interior rearview mirror. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only. Modifications of the invention will occur to those skilled in the art and to those who make or use the invention. Furthermore, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention.

We claim:

1. A mirror mount for forming a ball-and-socket connection for adjustably supporting a vehicle rearview mirror head, comprising:

a first mount component including a washer-like base with a flat surface defining an attachment plane, a locator on the flat surface and adapted to orient the mount component during attachment of the mount component to the mirror head such that the flat surface is in facing engagement with at least a part of the mirror head, a stem extending from a side of the washer-like base opposite the attachment plane, and a ball section on an end of the stem; the ball section being larger in diameter than the stem and defining a circumferential circular clearance area around the stem at a bottom of the ball section, the clearance area being shaped and adapted to receive an end of a socket-forming component that adjustably receives and engages the ball section to form the ball-and-socket connection;

the mount component including a bore extending perpendicular to the attachment plane through the washer-like base and into the stem for receiving an attachment screw; the stem defining a first longitudinal centerline and the bore defining a second longitudinal centerline that extends at an acute angle to the first longitudinal centerline, with the circumferential circular clearance area defining a second plane that extends perpendicular to the first longitudinal centerline but that extends at the acute angle to the attachment plane.

2. The mirror mount defined in claim 1, wherein the acute angle is at least about 15°.

3. The mirror mount defined in claim 2, wherein the acute angle is at least about 30°.

4. The mirror mount defined in claim 2, wherein the circumferential circular clearance area is sized to allow the mount component to adjust at least about 25° in all directions from the first longitudinal centerline.

5. The mirror mount defined in claim 1, including a second mount component with a second ball section, and including a connector extending between the first and second ball sections, the connector including a tube with socket-defining members at each end for operably receiving the first and second ball sections.

6. The mirror mount defined in claim 5, wherein the first and second ball sections define center points, and wherein the second mount component includes a planar side configured for attachment to a window-attached anchor; a first distance between center points of the first and second ball sections being less than a second, perpendicular distance between the planar side and a plane parallel thereto and passing through a center point of the second ball section.

7. The mirror mount defined in claim 6, wherein the second distance is at least about ¼ inch longer than the first distance.

8. The mirror mount defined in claim 6, wherein the second distance is at least about ½ inch longer than the first distance.

9. A mirror mount for forming a double ball-and-socket connection for adjustably supporting a vehicle rearview mirror, comprising:

a mirror-head-attached mount component including a washer-like base with a flat surface defining an attachment plane, a locator on the washer-like base for orienting the mount component during attachment of the mount component to a mirror head such that the flat surface is in facing engagement with at least a part of the mirror head, a first stem extending from a side of the washer-like base opposite the attachment plane, and a first ball section on an end of the first stem; the first ball section being larger in diameter than the first stem and defining a first circumferential circular clearance area around the first stem at a bottom of the first ball section; the first ball section defining a first center point;

a window-attached mount component including a second base defining a planar side configured for attachment to a window-attached anchor, a second stem extending from the second base opposite the planar side, and a second ball section on an end of the second stem; the second ball section being larger in diameter than the second stem and defining a second circumferential circular clearance area around the second stem at a bottom of the second ball section; the second ball section defining a second center point; the second base, the second stem and the second ball section being formed by solid and continuous material; and a connector including a tube section extending between the first and second ball sections and including first and second socket-defining components that adjustably angularly engage the first and second ball sections, respectively, to define adjustable first and second ball-and-socket connections; the center points of the first and second ball sections defining a first distance that is less than a second perpendicular distance between the planar side and a plane parallel thereto and passing through the second center point of the second ball section, the first and second circumferential circular clearance areas being shaped to receive ends of the tube section to maintain maximum angular adjustability, whereby a multi-axial angular adjustability provided by the first and second ball-and-socket connections is maintained while stability and strength provided by the solid and continuous material forming the second distance on the window-attached mount component is maintained.

10. The mirror mount defined in claim 9, wherein the second distance is at least about ½ inch longer than the first distance.

11. The mirror mount defined in claim 9, wherein the tube section defines a tube longitudinal centerline, and wherein the first and second stems define first and second longitudinal centerlines, and wherein at least one of the first and second stems extend at an acute angle to the tube longitudinal centerline.

12. The mirror mount defined in claim 11, wherein both of the first and second longitudinal centerlines extend at an acute angle to the tube longitudinal centerline.

13. The mirror mount defined in claim 11, wherein the clearance area is sized to allow the mount component to adjust at least about 25° in all directions from the first longitudinal centerline.

14. The mirror mount defined in claim 9, wherein the mirror mount component includes a bore extending perpendicular to the attachment plane through the washer-like base and into the first stem, the bore being shaped and adapted to receive an attachment screw to attach a mirror head to the mirror mount component.

* * * * *